United States Patent
Zankowski

(10) Patent No.: US 9,454,823 B2
(45) Date of Patent: Sep. 27, 2016

(54) KNOWLEDGE-BASED AUTOMATIC IMAGE SEGMENTATION

(75) Inventor: Corey Zankowski, San Jose, CA (US)

(73) Assignee: arian Medical Systems, Inc., Palo Alto, CA (US)

( * ) Notice: Subject to any disclaimer, the term of this patent is extended or adjusted under 35 U.S.C. 154(b) by 656 days.

(21) Appl. No.: 12/845,358

(22) Filed: Jul. 28, 2010

(65) Prior Publication Data

US 2012/0027271 A1   Feb. 2, 2012

(51) Int. Cl.
  *G06T 7/00*   (2006.01)

(52) U.S. Cl.
  CPC .......... *G06T 7/0081* (2013.01); *G06T 7/0087* (2013.01); *G06T 2207/20128* (2013.01); *G06T 2207/30004* (2013.01)

(58) Field of Classification Search
  CPC ............... G06T 7/0081; G06T 7/0087; G06T 2207/20128; G06T 2207/30004
  See application file for complete search history.

(56) References Cited

U.S. PATENT DOCUMENTS

| | | | |
|---|---|---|---|
| 5,859,891 A | 1/1999 | Hibbard | |
| 6,249,594 B1 | 6/2001 | Hibbard | |
| 6,611,630 B1 | 8/2003 | Miller et al. | |
| 7,646,936 B2 | 1/2010 | Nord et al. | |
| 7,672,497 B2 | 3/2010 | Nicponski | |
| 7,680,312 B2 | 3/2010 | Jolly et al. | |
| 7,817,836 B2 | 10/2010 | Chao et al. | |
| 7,831,073 B2 * | 11/2010 | Fu et al. | 382/128 |
| 7,876,934 B2 | 1/2011 | Georgescu et al. | |
| 7,995,813 B2 | 8/2011 | Foshee et al. | |
| 8,050,503 B2 | 11/2011 | Dekel et al. | |
| 8,199,990 B2 | 6/2012 | Foshee et al. | |
| 2007/0014453 A1 * | 1/2007 | Nowinski et al. | 382/128 |
| 2007/0019846 A1 | 1/2007 | Bullitt et al. | |
| 2008/0232714 A1 | 9/2008 | Nord et al. | |
| 2008/0240527 A1 * | 10/2008 | Keller | 382/128 |
| 2008/0273779 A1 * | 11/2008 | Pekar | G06T 3/0081 382/131 |
| 2009/0028403 A1 | 1/2009 | Bar-Aviv et al. | |
| 2009/0087124 A1 | 4/2009 | Nord et al. | |
| 2009/0226060 A1 * | 9/2009 | Gering et al. | 382/128 |

(Continued)

FOREIGN PATENT DOCUMENTS

| | | |
|---|---|---|
| CN | 1952981 | 4/2007 |
| JP | 2007-175434 A | 7/2007 |
| WO | WO 03/043490 A1 | 5/2003 |
| WO | WO 2007/063476 A2 | 6/2007 |

OTHER PUBLICATIONS

Construction and Evaluation of an Average CT Brain Image for Inter-Subject Registration; Jongen, et al; Jan. 10, 2003.

(Continued)

*Primary Examiner* — Katrina Fujita

(57) ABSTRACT

A method for medical image segmentation. The method includes accessing and updating a knowledge-base in accordance with embodiments of the present invention. The techniques include: receiving a medical image and computing a sparse landmark signature based on the medical image content. Next, a knowledge-base is searched for representative matches to form a base set, wherein the base set comprises a plurality of reference image sets. A portion of the plurality of reference image sets of the base set is deformed to generate mappings from the base set to the medical image set. Finally a weighted average segmentation for each structure of interest of the medical image set is determined.

30 Claims, 5 Drawing Sheets

(56) References Cited

U.S. PATENT DOCUMENTS

| | | |
|---|---|---|
| 2009/0228299 A1* | 9/2009 | Kangarloo et al. ............ 705/2 |
| 2010/0034440 A1* | 2/2010 | Zhan .................. G06T 7/0028 |
| | | 382/128 |
| 2010/0142774 A1* | 6/2010 | Ben-Haim et al. .......... 382/128 |
| 2010/0152577 A1* | 6/2010 | Young et al. ............... 600/431 |
| 2010/0295848 A1 | 11/2010 | Grewer et al. |
| 2011/0007959 A1* | 1/2011 | Schulz et al. ............... 382/131 |
| 2011/0052018 A1 | 3/2011 | Blaffert et al. |
| 2011/0150309 A1* | 6/2011 | Barfett et al. .............. 382/131 |
| 2011/0153547 A1 | 6/2011 | McNutt et al. |
| 2011/0176712 A1* | 7/2011 | Hill et al. ................... 382/128 |

OTHER PUBLICATIONS

"Medical Image Registration Based on Deformable Contour", Chun-Guang, et al. Biomedical Engineering Institute, Zhejiang University, Hangzhou 310027, Journal of Computer Aided Design and Computer Graphics, vol. 11, No. 2 Mar. 1999.

"Image Segmenting Using Segmental Deformable Model Based on Affine Invariants", Ran, et al. Department of Computer Science and Engineering, Shanghai Jiaotong University, Shanghai 20030 China, vol. 23 No. 6, Dec. 2004.

* cited by examiner

KNOWLEDGE-BASED AUTOMATIC IMAGE SEGMENTATION

TECHNICAL FIELD

The present disclosure relates generally to the field of automatic image segmentation and more specifically to the field of medical image automatic segmentation configured for medical applications.

BACKGROUND

When medical imaging is necessary to observe an internal organ or a set of internal organs, there are several systems that may be utilized: X-ray, magnetic resonance imaging (MRI), computed tomography (CT), and others. When CT or MRI imagery, for example, is used, a series of two-dimensional images are taken from a three-dimensional volume. Here, each two-dimensional image is an image of a cross-sectional "slice" of the three-dimensional volume. The resulting collection of two-dimensional cross-sectional slices can be combined to create a three dimensional image or reconstruction of the patient's anatomy. This resulting three-dimensional image or three-dimensional reconstruction will contain the desired internal organ. This portion of the three-dimensional image or reconstruction that contains the structure of interest may be referred to as a volume of interest. Note that when it is desired to observe multiple internal organs, there will then be a plurality of structures of interest as well.

These one or more structures of interest may be viewed in several ways. A first and simplest way to view the structure(s) of interest would be to merely view the original CT or MRI image slices for the patient, with each slice containing a view of the structure(s) of interest. A second, and more complicated method to view the structure(s) of interest would be to combine the series of two-dimensional cross-sectional slices into a single three-dimensional representation where the structure(s) of interest may be represented as solid, opaque, or translucent, etc., objects that may then be manipulated (e.g., rotated) to allow viewing from multiple angles.

One purpose of the three-dimensional reconstruction of the structure(s) of interest containing diseased or abnormal tissues or organs is the preparation of a three-dimensional radiation therapy treatment plan. Radiation therapy treatment plans are used during medical procedures that selectively expose precise areas of the body, such as cancerous tumors, to specific doses of radiation to destroy the undesirable tissues. To develop a patient-specific radiation therapy treatment plan, information is extracted from the three-dimensional model to determine parameters such as organ shape, organ volume, tumor shape, tumor location in the organ, and the position or orientation of several other structures of interest as they relate to the affected organ and any tumor.

The two-dimensional slices may be individually viewed on a computer screen and with the use of conventional graphics programs, the contours of organs or structures of interest can be traced out by hand. Contours are connected line segments that define the outline of a structure of interest, which may be an organ, a portion of an organ, a tumor, diseased tissue, or a whole patient outline. Alternatively, these structures of interest in specific organs such as the brain or prostate, for example, may be identified with various structure-specific automatic contouring and/or automatic segmentation software programs (subdividing an image into discrete regions) that outline or fill the shape of the structure of interest on each two-dimensional slice of a set of slices.

SUMMARY OF THE INVENTION

This present invention provides a solution to the challenges inherent in medical image automatic segmentation. In a method according to one embodiment, a series of steps provide knowledge-based medical image automatic segmentation. After receiving a medical image, a knowledge-base is searched for representative matches. A plurality of reference image sets are selected to form a base set. A portion of the reference image sets in the base set are deformed to generate mappings from the reference images to the medical image. A weighted average segmentation for each organ of interest is calculated. In one embodiment, the weighted average segmentation for each organ of interest is used as a seed for an automated structure-specific segmentation algorithm. In another embodiment, after the automatic segmentation algorithms are complete, reviewed and corrected as necessary, the medical image and its associated meta-data, sparse landmark signatures and structures of interest are added to the knowledge-base.

BRIEF DESCRIPTION OF THE DRAWINGS

The present invention will be better understood from a reading of the following detailed description, taken in conjunction with the accompanying drawing figures in which like reference characters designate like elements and in which.

DETAILED DESCRIPTION

Figure 1:
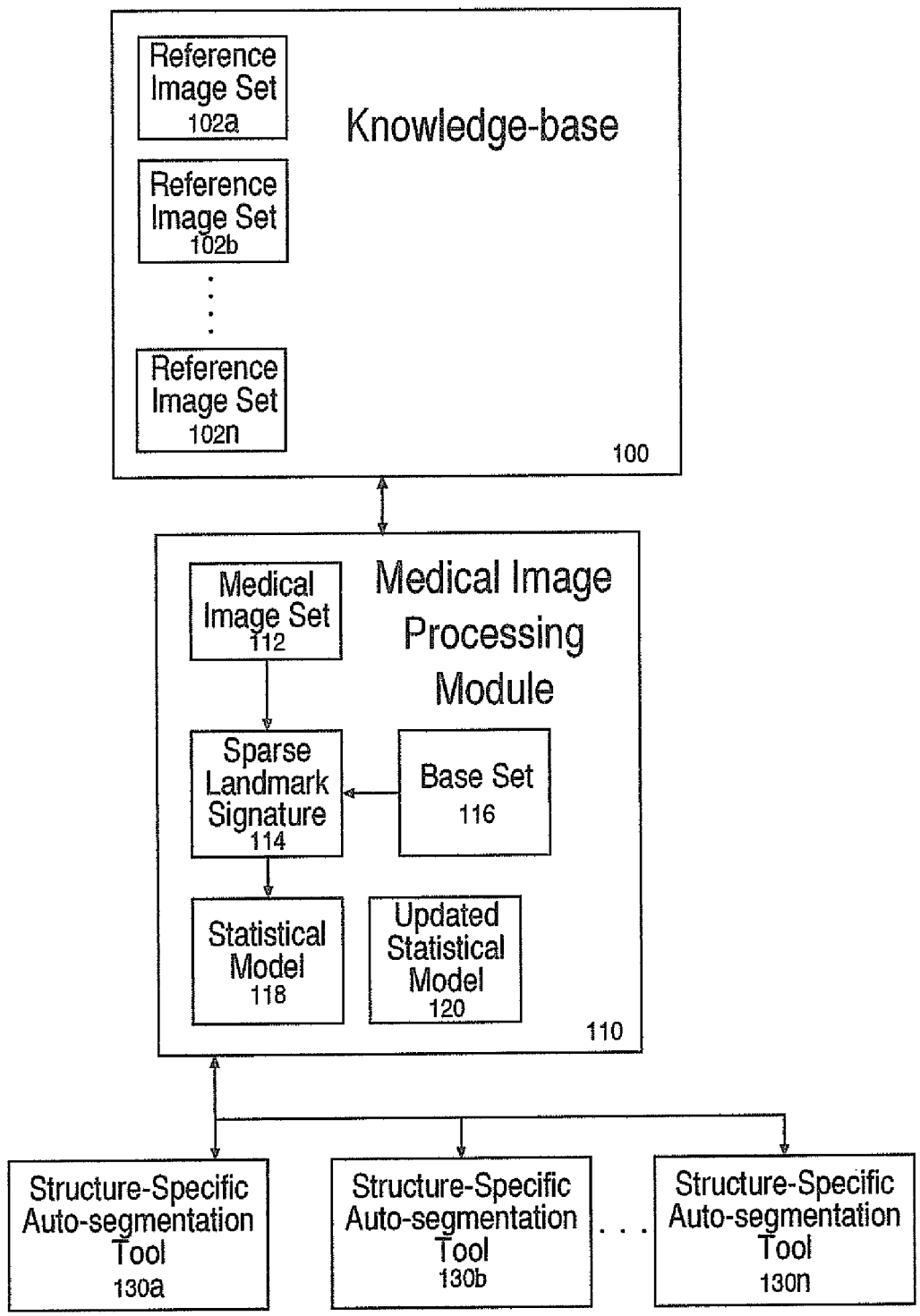
FIG. 1 is a simplified block diagram illustrating a system for providing knowledge-based medical image automatic segmentation, in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as " processing" or "accessing" or " executing" or " storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

This present invention provides a solution to the increasing challenges inherent in medical image automatic segmentation. In particular, various embodiments of the present disclosure provide automatic segmentation of a patient's two-dimensional medical images through the use of a knowledge base comprising a plurality of reference image sets, wherein each reference image set comprises a plurality of two-dimensional slices. Each slice in a reference image set has been segmented and contoured, with each structure of interest (e.g., organs, tumors, diseased tissues, etc.) labeled. As discussed in detail below, a plurality of reference image sets with similarities (e.g., similar sparse landmark signatures) to the medical image set are selected to form a base set and each deformed with a deformable image registration algorithm to generate mappings from the selected reference images to the medical image. Segmented structures of interest in each selected reference image are also deformed to the medical image to generate mappings to the medical image. A weighted average segmentation for each organ of interest is calculated, wherein the weighted average segmentation for each organ of interest is used as a "seed" for structure-specific automatic segmentation algorithms. After the automatic segmentation algorithms for each structure of interest are complete, the results are reviewed and contours are corrected as required. After approving the medical image, the medical image and its associated meta-data, sparse landmark signatures and structures of interest are added to the knowledge-base.

Medical Image Segmentation

As is well known in the art, image segmentation is a process for reviewing a digitized medical image, and based on the merits of the medical image, differentiating or identifying structures of interest and labeling them. For example, when reviewing a medical image of the thorax, using image segmentation, a line can be drawn around a section of the image and labeled as "lung." In other words, everything within the line is deemed lung, and everything not inside the line is deemed not lung. Image segmentation is utilized in radiation therapies, where a practitioner needs to precisely define where the radiation treatment is to be placed and just as importantly, where the radiation treatment is not to be placed. A structure of interest may be defined as: an organ; a tumor; diseased tissues; and bones visible in the medical image, for example. CT and MRI scans, as mentioned above, are common medical image modalities. However, any two-dimensional image may be segmented where a practitioner is interested in differentiating between structures of interest in the image. In CT and MRI scans where a plurality of slices is generated, segmentation is usually performed on each slice in turn. For the sake of convenience and simplicity, segmenting a CT scan, for example, refers to segmenting each slice in turn.

Medical image segmentation is used with, for example, IMRT (intensely modulated radiation), to paint radiation, or shape the radiation in the body to conform to the tumor. Segmentation is a core benefit: when a radiation treatment may be shaped so as to conform to a tumor, critical organs can then be avoided. Rather than merely fitting or shaping the radiation therapy to fit the tumor, critical organs, such as the brain stem, for example, can be avoided. An exemplary radiation therapy utilizes pencil beams of radiation, placing radiation into the body at targeted locations. However, to do that, the computer running the IMRT treatment needs to know where the brain stem is. Treatment planning software for the IMRT takes medical images (e.g., CT or MRI data sets) and identifies all the organs or structures of interest at risk (especially those structures that are sensitive to radiation, or that must not be irradiated regardless of their radiation sensitivity). Further, those structures of interest that are targets for the radiation therapy are also identified. The structures as drawn on the individual slices are combined into volumes of interest, spanning multiple slices. Given the volumes drawn and the doses prescribed for each volume identified, the treatment planning software will calculate the best method for putting the dose in.

But as medical imaging resolution increases providing additional slices, and the number of structures that must be identified, as well as the precision with which they must be identified increases, the treatment planning process takes longer. This is especially apparent when each slice must be segmented by hand. However, even with automatic segmentation algorithms currently available, the practitioner is still often required to manually drop the seeds into the image, and must review each slice individually. "Dropping a seed" is a process whereby a practitioner selects points within an area of a medical image and identifies them as part of a particular structure of interest (e.g., a prostate, bladder, or femur). Therefore, an excessive amount of time can be spent manually seeding each medical image. However, even after seeding the automatic segmentation algorithms, the practitioner is often required to edit the segmentation and contouring results to correct them. This editing is required as the automated segmentation results will commonly produce some segmentation and/or contouring errors requiring practitioner editing to correct. The end result is that even with automatic segmentation software tools, the time required is often little better than manually segmenting; with the necessity to drop seeds and then frequently spend a significant amount of time editing to correct the autosegmentation and autocontouring software results.

Automatic segmentation is further complicated by the fact that automatic segmentation tools are often tailored to be structure specific, such that they only work well on certain internal organs. For example, an automatic segmentation tool utilizing edge detection has difficulty in automatically individually segmenting the bladder and prostate, because they can't be individually differentiated. When the bladder is full and touching the prostate, the prostate-bladder barrier can't be seen. The end result is difficulty in determining where one ends and the other one begins. Instead, automatic segmenting tools for the prostate are forced to rely on modeling and looking at the curvatures of the bladder and prostate. And of course, even when using a structure-specific automatic segmentation tool, the individual seeds must still be placed within each structure of interest.

Knowledge-based Image Automatic Segmentation

FIG. 1 illustrates a knowledge-base 100 in accordance with an embodiment of the present invention. A knowledge base 100 comprises a plurality of reference image sets 102a-102n. Each reference image set 102a-102n comprises two-dimensional slices of a three-dimensional volume. Each reference image set 102a-102n further comprises meta-data, a sparse landmark signature corresponding to each reference image, and a plurality of segments and contours corresponding to structures of interest seen in each individual reference image slice.

In one exemplary embodiment a knowledge-base 100 initially comprises a plurality of expert cases. Each of these expert cases contain reference image sets 102a-102n with segmentations and contours that have been individually hand-drawn. Each structure of interest has been labeled.

In another embodiment of the knowledge-base 100, the initial plurality of reference image sets 102a-102n would share common characteristics. For example, each reference image set 102a-102n in the knowledge-base 100, would have a common characteristic in the meta-data, such as race, sex, diagnosis, treatment site, age, and size of patient, etc. A knowledge-base 100 used predominantly in the treatment of Oriental patients would be different from a knowledge-base 100 used predominantly in the treatment of Europeans, for example. Similarly, a knowledge-base 100 used in an exclusively female practice would only need to comprise reference data sets 102a-102n of female patients.

FIG. 1 further illustrates a medical image processing module 110. The medical image processing module 110 receives an image set for a current patient called a medical image set 112. The medical image processing module 110 processes the medical image set 112 to reduce each image slice to a sparse landmark signature. The end result is a sparse landmark signature set 114.

A sparse landmark signature based on a medical image slice will allow up to 90% of the information contained in a medical image set to be ignored. Rather than running the algorithms pixel by pixel across each slice of a medical image set 112, which would consume an excessive amount of computational time and resources, a sparse landmark signature reduces the individual slices to only a collection of points for further processing.

For example, a medical image set 112 of a male patient with prostate cancer would have a particular sparse landmark signature set 114. If the diagnosis is prostate cancer, the three-dimensional volume of the medical image set 112 is the middle of the body. Because the pelvic girdle defines the location of the prostate, the individual slices are scanned from top to bottom, looking for the first instance of bone (image pixels of bright intensity). This is accomplished for both sides of the pelvic girdle, allowing the location of the femoral heads to be identified. Next, the point where the pelvic girdle ends is also located. Triangulating from those three points almost always locates the prostate. Therefore these three points are included as part of a sparse landmark signature set 114 of the medical image set 112. Lining up the points creates the signature. An arrangement of points allows point-based segmentation. After the points are emplaced the more complicated medical image slice isn't needed any more. In one exemplary embodiment, once all the points are selected, an automatic segmentation tool library is accessed to select a drawing or model of the pelvic girdle from the above example and stretch it until all the points are lined up. Whatever shape the contours have, it is now considered the starting point for further refinement.

However, care must still be taken so as not to fool an automatic segmentation tool. With a minimal sparse landmark signature it is possible for an algorithm to mistake head and neck signatures (spine and shoulders) for pelvic girdle. Therefore, in exemplary embodiments, additional features are included in the sparse landmark signature. The total number of points in a signature will be counted. For example, if a signature contains twelve points, prostate cases can be ruled out. Rather than prostate, a signature with twelve points identifies a head and neck case. Therefore, based on a full review of a signature which identifies for example, twelve points, a head and neck library would be searched for a head and neck model rather than a pelvic girdle model.

As further illustrated in FIG. 1, after the sparse landmark signature set 114 of the medical image set 112 is generated, reference image sets 102a-102n can be selected based upon their similarities to the present patient medical image set 112 and the corresponding sparse landmark signature set 114. In an exemplary embodiment of the present invention, a plurality of reference image sets 102a-102n is selected. Exemplary embodiments can select from as few as three reference image sets 102a-102n to as many as ten or more reference image sets 102a-102n. In one exemplary embodiment, three reference image sets 102a-102c are selected. The selected reference image sets 102a-102c become a base set 116.

In an exemplary embodiment of the present invention, the medical image processing module 110 begins the reference image set 102a-102n selection process by reviewing meta-data attached to the current medical image set 112. As is well known in the art, meta-data may include information associated with a particular patient at a very high level that is not especially personalized. It would include such details as: age, sex, diagnosis, weight, whether or not there is nodal involvement, any co-morbidities, treatment site, side of the body, and approximate location of tumor. The available meta-data attached to the current medical image set 112 is used to start a search through the knowledge-base, reviewing the meta-data attached to reference image sets 102a-102n for corresponding matches. Through the use of meta-data, the knowledge-base can be sorted so that in an exemplary medical image set with meta-data identifying a male patient with advanced lung cancer, only reference image sets of males with lung tumors on the same side of the body are reviewed. From the knowledge-base, the top reference image set 102a-102c matches are selected based upon their similarities to the present medical image set 112 meta-data and sparse landmark signature.

A base set 116 contains as noted above in exemplary embodiments, anywhere from three to ten or more reference image sets 102a-102n. A plurality of reference image sets 102a-102n are selected to reduce the error inherent in each individual reference image set 102a-102n. It is obvious that a single reference image set 102a-102n won't be a perfect match; there will be some disagreement between the reference image set 102a-102n and the medical image set 112. A plurality of reference image sets 102a-102n in the base set 116 allows the formation of a statistical model to serve as a reference image.

In an exemplary embodiment of the present invention, each of the selected reference images sets 102a-102c in the base set (in this exemplary embodiment, three reference cases are selected) is individually deformed to the medical image set. In other words, the points in the sparse landmark signature of each reference image set 102a-102c (one slice at a time) are deformed to the points in the sparse landmark signature set 114 of the medical image set 112. In one exemplary embodiment, a deformable image registration algorithm will take the selected reference image sets 102a-102c and the medical image set 112 which has no segmentation or contouring and morph each of the reference image sets 102a-102c one at a time, and one slice at a time, to look like the medical image set 112. The registration algorithm will also transfer the contours from each reference image set 102a-102c to the medical image set 112 as well. The contours are each transferred along with the labels. By deforming each of the three selected reference image sets 102a-102c to the medical image set 112, the contours that were tagged to a pixel will also move as the pixels move. Each of the points from each of the reference image sets 102a-102c are deformed to the points of the medical image set 112. In another embodiment of the present invention, a portion of the selected reference image sets 102a-102n in the base set are deformed to the medical image set. This portion can be one or more of the reference image sets 102a-102n.

As multiple reference image sets 102a-102c are individually deformed to the medical image set 112, exemplary embodiments of the present invention are therefore using a statistical-based algorithm, instead of only an image-based algorithm. By taking the results coming from the deformation of the three reference image sets 102a-102n to the medical image set 112 and averaging them, statistical processing will provide a final result that is an average of the three (or whatever number is chosen) reference images 102a-102c. It's more statistically likely that the average for the three top references will converge on a more correct answer than that any one of them will be individually correct. As illustrated in FIG. 1, the medical image processing module will therefore deform the base set 116 to the sparse landmark signature 114 of the medical image set 112 to create a statistical model 118 containing segmentation and contouring of the structures of interest in the medical image set 112.

In an exemplary embodiment, weighted-average segmentation is thereby provided to create the statistical model 118. If all three reference image sets 102a-102c agree very well, then a simple average of the three will be sufficient. But if two of them agree closely and the third had an outlier (e.g., a contour or segmentation result for a particular structure of interest is different from the other results), the third result's outlier could be de-emphasized in the statistical model 118, making the assumption that the outlier is incorrect. Weighted-average segmentation for example, would look at the standard deviation of the results for each of the structures of interest that are identified in the statistical model 118. A simple method of weighting the results when an outlier appears would be to discard the outlier result. It should be noted that the statistical weighted-averaging is not applied to the patient, i.e., medical image set 112, but to each of the resulting structures of interest within the medical image set 112. In other words, in an exemplary embodiment there can be as many weighted mixes between the three reference image sets 102a-102c as there are structures of interest. The statistical model 118 therefore provides a good starting point for further segmentation processing. The statistical model can with a certain amount of statistical certainty, identify what is prostate or lung for example, even if the outline contours aren't perfect. That is, at least what is inside the contour has been identified as prostate or lung, as the case may be.

In an exemplary embodiment, when the weighted-average segmentation provided to the statistical model 118 is not approved by the practitioner, additional reference image sets that likewise contain common meta-data characteristics and similar sparse landmark signatures will be selected and added to the base set 116 to be registered (i.e., deformed) to the medical image set 112. In an exemplary embodiment, the additional reference image sets are added one at a time. Again, as discussed above, the sparse landmark signature of the newly added reference image set would also be deformed to the sparse landmark signature of the medical image set as the original three reference image sets were. After statistical processing, an updated weighted-average segmentation is provided to the statistical model 118 for review by the practitioner. Additional reference image sets can be added to the base set 116 as required, as long as additional candidate reference image sets remain in the knowledge-base 100, and their addition to the base set 116 continues to improve the weighted-average segmentation of the statistical model 118.

The selected reference image sets 102a-102n also contain corresponding treatment prescriptions, strategies, and IMRT dose objectives. By also providing the treatment prescription, strategy and IMRT dose objectives for each of the selected reference image sets, they can provide a reasonable starting point for the current patient. Further, statistical parameters of the statistical model 118 may also be evaluated, by looking at non-image based components from the reference image sets (shape, volume, smoothness, density, etc.) and thereby refine the resulting statistical model 118 and updated statistical model 120.

Knowledge-based Image Sub-volume Segmentation

Figure 4:
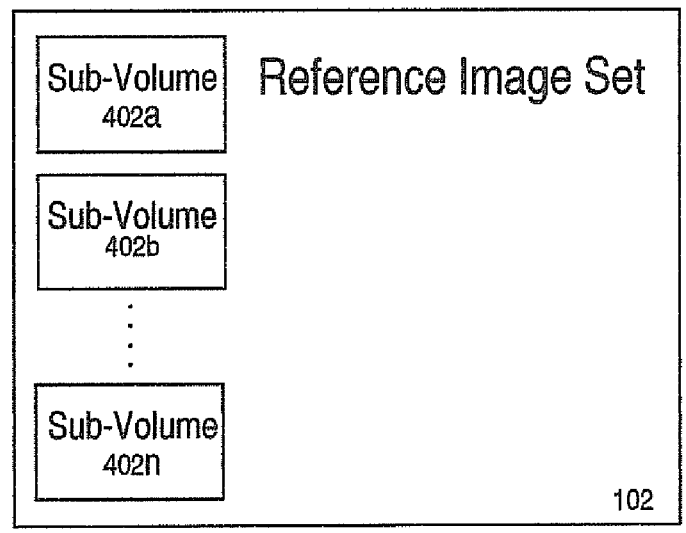
FIG. 4 illustrates steps of an example process for knowledge-based medical image automatic segmentation of a cohort of reference image sets in the knowledge-base, in accordance with an embodiment of the present invention.
Figure 4:
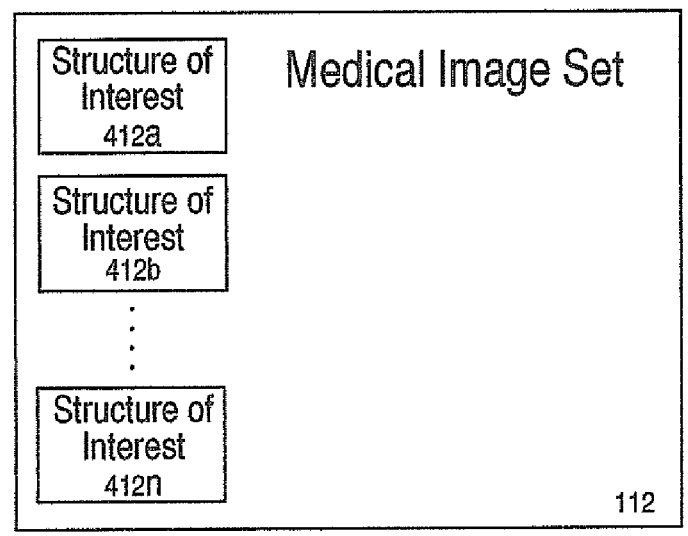

In an exemplary embodiment, the process described above for a medical image set 112 and a base set 116 comprising a plurality of reference image sets 102a-102n is repeated for a plurality of structures of interest or "sub-volumes" of the medical image set from a plurality of patient cases in the knowledgebase, as illustrated in FIG. 4. A sub-volume will typically contain only a single structure of interest rather than all of the structures of interest found in the medical image set. A plurality of reference image set sub-volumes 402a-402n, grouped as sub-volume base sets, for each identified structure of interest 412a-412n of the medical image set 112 is selected. In other words, a plurality of reference image set sub-volumes 402a-402n are selected for each sub-volume (i.e., structure of interest) of the medical image set. For example, for a medical image set sub-volume for the prostate, a plurality of prostate sub-volumes from reference image sets will be selected. In other words, rather than entire reference image sets 102*a*-102*n*, only a prostate sub-volume 412*a*-412*n* of the reference image sets 102*a*-102*n* would be selected. Again, in an exemplary embodiment, the number is three. Each plurality of reference image set sub-volumes is therefore a sub-volume base set for a particular structure of interest. There can be a sub-volume base set for each structure of interest 412 in the medical image set 112.

As described above for reference image sets 102*a*-102*n* and the medical image set 112, in the same manner, each reference image set sub-volume 402 is deformed to a corresponding structure of interest 412 of the medical image set 112, just as each reference image set 102 is deformed to the medical image set 112. Further, as described above, in another embodiment of the present invention, a portion of the selected reference image sets sub-volumes 402*a*-402*n* in the plurality of sub-volume base sets is deformed to the structures of interest 412*a*-412*n* in the medical image set 112. This portion can again be one or more of the reference image set sub-volumes 402*a*-402*n*. After a weighted-average segmentation for each structure of interest in the medical image set 112 is completed as described above, each structure of interest or sub-volume 412*a*-412*n* would also have a corresponding sparse landmark signature set that is also a portion of the sparse landmark signature set 114 of the medical image set 112. By selecting particular structures of interest 402 (i.e., the best candidates) of reference image sets 102 (and their corresponding sparse landmark signatures for the structures of interest) to deform to the corresponding structure of interest 412 in the medical image set 112 (and its corresponding sparse landmark signature), the resulting weighted-average segmentation of each structure of interest 412*a*-412*n* used to create the statistical model 118 can be further improved. This is because rather than seeking for a reference image set 102 candidate that is a good all-around match to the patient anatomy, only the individual sub-volumes 402 or structures of interest are considered. Therefore, a reference image set 102 that would not be a good candidate for all structures of interest can still be a good sub-volume candidate.

Continuous Knowledge-based Improvement

However, to get better results with the knowledge-base 100, additional reference image sets need to be added to the knowledge-base 100. In other words, additional clinical cases with their patient specific meta-data, medical image sets, sparse landmark signatures, statistical model can be added to the knowledge base after the practitioner has completed the patient-specific treatment plan and approved the segmentation and contouring of the structures of interest in the medical image set. After the practitioner has reviewed, edited (as needed), and approved the segmentation results, the subject patient's information can become a new reference image set with its own attached meta-data and treatment information to be placed in the knowledge-base to increase the number of candidate reference image sets available. This new reference image set will then be available to be reused as part of a base set the next time there is a patient with similar meta-data, etc. Even with very personalized, patient-specific medicine, these described processes allow the creation of a closed loop: each iteration of the process allows the addition of a new reference image set 102 to the knowledge-base. Therefore, as more reference image sets 102 are added to the knowledge-base 100, the more robust the knowledge-base 100 becomes, with improved statistical modeling and better end results. As more reference image sets 102 are placed into the knowledge-base 100, the searches can be further refined and based on additional criteria to ensure that the selected reference image sets 102*a*-102*n* are close matches to the medical image set 112.

Statistical Model Used as a Seed

In an exemplary embodiment, the statistical model 118 with its weighted-average segmentation of each structure of interest can be used as a seed itself Rather than traditional structure-specific segmentation tools requiring manually selected seeds before the processing begins, the seeds can be provided by the identified structures of interest from the statistical model 118. By providing seeds that are statistically probable to be drawn in pixels inside the structure of interest, it allows any of the previously discussed segmentation methods to begin with improved seed selections. Further, using the statistical model's weighted-average segmentation of structures of interest allows these other segmentation methods to avoid having to start from scratch.

While there is no guarantee that a structure of interest will be segmented correctly, there is a good statistical possibility that a cluster of pixels in the middle of the segmentation of the structure of interest will be within that actual structure of interest. In an exemplary embodiment, this central cluster of statistically significant pixels is then used as the "seed" for other automatic segmentation algorithms.

In an exemplary embodiment, as illustrated in FIG. 1, and described in more detail below, the statistical model 118 is used as a seed for deformable image registration and to drive the autosegmentation component of structure-specific automatic segmentation tools 130*a*-130*n*. In an exemplary embodiment, the automatic segmentation tools 130*a*-130*n* can be either structure-specific segmentation tools or non-structure-specific segmentation tools. When the segmentation results are returned by the automatic segmentation tools 130*a*-130*n* to the medical image processing module 110 the results can be used to create an updated statistical model 120 that comprises weighted-average segmentation of each structure of interest in the medical image set 112, as discussed in detail below.

The automatic segmentation tools 130*a*-130*n* use the seed provided by the statistical model 118 to calculate the segmentation of one or more structures of interest. These structure-specific segmentation algorithms can use a structure-specific model to aid in completing the segmentation that will look at all the data within the image that has been labeled as a seed for the structure of interest (e.g., the prostate or lung). This gives the structure-specific algorithm a very good starting point. The structure-specific algorithms work best when they are working on the specific structures they are designed to segment.

The statistical weighted averaging can also be extended to statistically weighted-averaging of these different algorithms depending on their abilities and whether there is something about the particular meta-data or the image that would make one algorithm more accurate than another. This allows the results from a plurality of algorithms to be averaged to arrive at an even more statistically accurate definition of a structure of interest by comparing the results from a plurality of structure-specific algorithms. The end result would be the medical image processing module calculating an updated statistical model 120 that comprises a weighted-average segmentation of each structure of interest in the medical image set 112. As discussed above, this updated statistical model 120 after being reviewed, editing, and finally approved by the practitioner for use with the current patient, may be added to the knowledge-base as a new reference image set 102.

Knowledge-based Autosegmentation Algorithm Improvements

In an exemplary embodiment, the above described processes can include an update to the statistical tools, by performing a difference calculation. The difference calculation compares what the system calculated to what was ultimately accepted by the practitioner, identifies the point(s) that failed, and acts to modify the behavior of the algorithm. By back-projecting the difference, changes are made to the algorithm configuration until an optimal solution results. Weighting functions can be adjusted to reach the optimal results.

In other words, if the system was failing to recognize a pelvis case, for instance, the selection of sparse landmarks would have to be adjusted so that a pelvis case is properly recognized. In another example, the way that deformal image registration is identifying a structure of interest may have to be changed if the location is correct, but the segmentation/contour result is incorrect. For example, if a gap exists between the computed and hand-drawn edge of an organ of interest, then the edge detection algorithm can be adjusted to correct it. Knowing where the gap was and where the correction was made, the correction can be worked into the particular algorithm to improve it.

Knowledge-based Autosegmentation Processes

Figure 2:
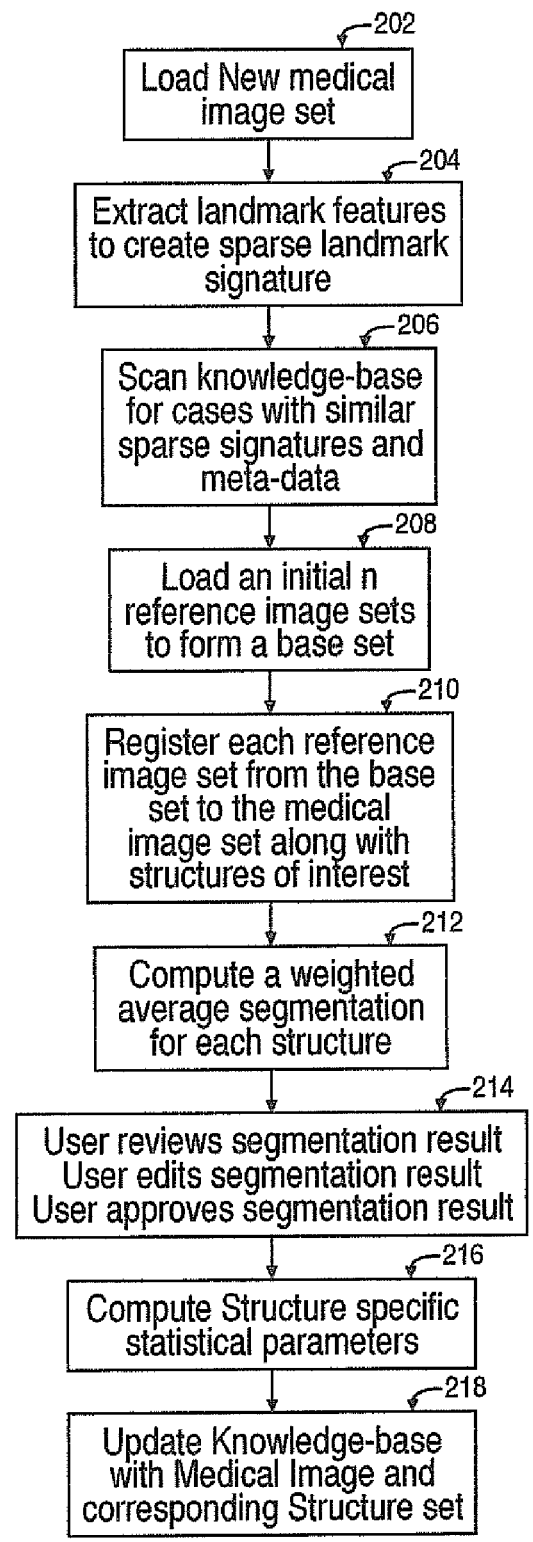
FIG. 2 illustrates steps of an example process for knowledge-based medical image automatic segmentation, in accordance with an embodiment of the present invention.

FIG. 2 illustrates the steps of a process in accordance with an embodiment of the present invention. Where the process includes steps that have already been explained in detail, they will not be repeated here. In step 202, a new medical image set 112 is loaded. The medical image set 112 may be loaded into the memory of a computer system. In step 204, landmark features (i.e., points on the medical image set 112) are extracted to create a sparse landmark signature 114.

In step 206, a knowledge-base 100 is scanned to search for reference image sets 102a-102n with similar sparse landmark signatures 114 and similar meta-data. In an exemplary embodiment, the sparse landmark signatures 114 serve as an index for the knowledge-base 100. In step 208, n reference image sets 102a-102n are selected to form a base set 116. In an exemplary embodiment, n=3. In step 210, a portion of the reference image sets 102a-102n is registered to the medical image set 112. This portion can be two or more of the selected reference image sets 102a-102n. In one exemplary embodiment, all of the selected reference image sets 102a-102n are registered. By deforming the reference image sets to the medical image, the segmented and contoured structures of interest in the reference image sets are also applied to the medical image set.

In step 212, a weighted average structure-specific segmentation is completed to form the statistical model 118. In other words, weighted averages are calculated for each structure to reach a weighted-average structure segmentation. As noted above, the statistical model 118 may now serve as a seed for use in other segmentation tools, including those that are structure-specific.

In step 214, the practitioner or user reviews, edits and approves the segmentation results. In step 216, structure-specific statistical parameters are computed and improved when possible (by looking at non-image based components from the reference image sets (shape, volume, smoothness, density, etc.). Then in step 218, the knowledge-base is updated with the medical image set 112 and its corresponding structure set (statistical model 118), sparse landmark signature set 114, and meta-data as a new reference image set 102.

Figure 3:
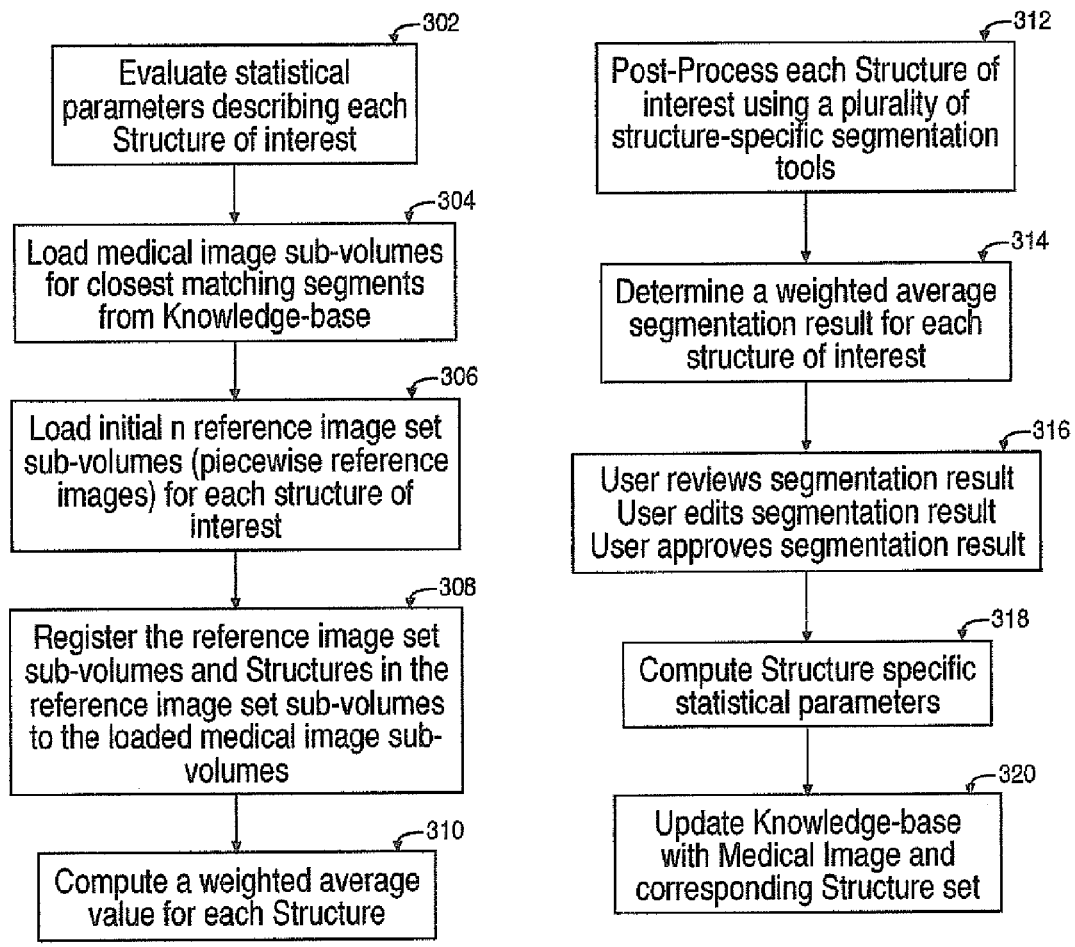
FIG. 3 illustrates steps of an example process for knowledge-based medical image automatic segmentation, in accordance with an embodiment of the present invention.

FIG. 3 illustrates the steps of a process in accordance with an embodiment of the present invention. Where the process includes steps that have already been explained in detail, they will not be repeated here. Step 302 begins after a statistical model 118 has been calculated. In step 302, statistical parameters describing each segmented structure of interest are further evaluated. In step 304, sub-volumes 412a-412n from the medical image set 112, wherein a sub-volume contains or is a structure of interest, are loaded into the computer for processing. These sub-volumes 412a-412n are the structures of interest with their own sparse landmark signatures that have already been segmented in FIG. 2, as described above. In other words, each sub-volume 412a-412n comprises a sub-volume sparse landmark signature. In step 306, n reference image set sub-volumes 402a-402n are loaded for each structure of interest (i.e., sub-volume) in the medical image set 112 to form corresponding sub-volume base sets. In one embodiment, n=3. Each of the reference image set sub-volumes 402a-402c of the plurality of sub-volume base sets is selected for a corresponding structure of interest 412a-412n in the medical image. In one embodiment, each reference image set sub-volume 402 can come from a different reference image set 102. In other words, if there are fifteen structures of interest in the medical image set 112, then there will be forty-five reference image sets 102a-102n providing the necessary forty-five reference image set sub-volumes 402a-402n contained in the fifteen sub-volume base sets. In another embodiment, a single reference set 102 can provide a plurality of reference image set sub-volumes 402a-402n.

In step 308, a portion of the reference image set sub-volumes 402a-402n and their segmented and contoured structures of interest are deformed or registered to the corresponding structure of interest 412a-412n of the medical image set 112. This portion can be two or more of the selected reference image sets 402a-402n. In one exemplary embodiment, all of the selected reference image set sub-volumes 402a-402n are registered or deformed, with the reference image set sub-volumes 402a-402n from each sub-volume base set deforming to the corresponding structure of interest 412a-412n of the medical image set 112. In step 310, a weighted-average segmentation value is calculated for each structure of interest 412a-412n in the medical image set 112. Calculating the weighted-average segmentation value for each structure of interest 412a-412n in the medical image set 112 allows the calculation of an updated statistical model 118.

In step 312 each structure of interest 412a-412n in the statistical model 118 is used as a seed and each post-processed by a plurality of structure-specific segmentation tools. Each structure of interest segmentation is used as a seed for a plurality of structure-specific segmentation tools. In step 314, a weighted-average segmentation result is calculated for each structure of interest based upon the segmentation results for each structure of interest 412a-412n provided by the structure-specific segmentation tools. As mentioned above, this weighted-average segmentation result for each structure of interest 412a-412n is the updated statistical model 120.

In step 316, the practitioner or user reviews, edits and approves the weighted-average segmentation results from step 314. In step 318, structure-specific statistical parameters are computed and improved when possible (by looking at non-image based components from the reference image sets (shape, volume, smoothness, density, etc.). Then in step 320, the knowledge-base is updated with the medical image set 112 and its corresponding structure set (statistical model 120), sparse landmark signature 114, and meta-data as a new reference image set 102.

Figure 5:
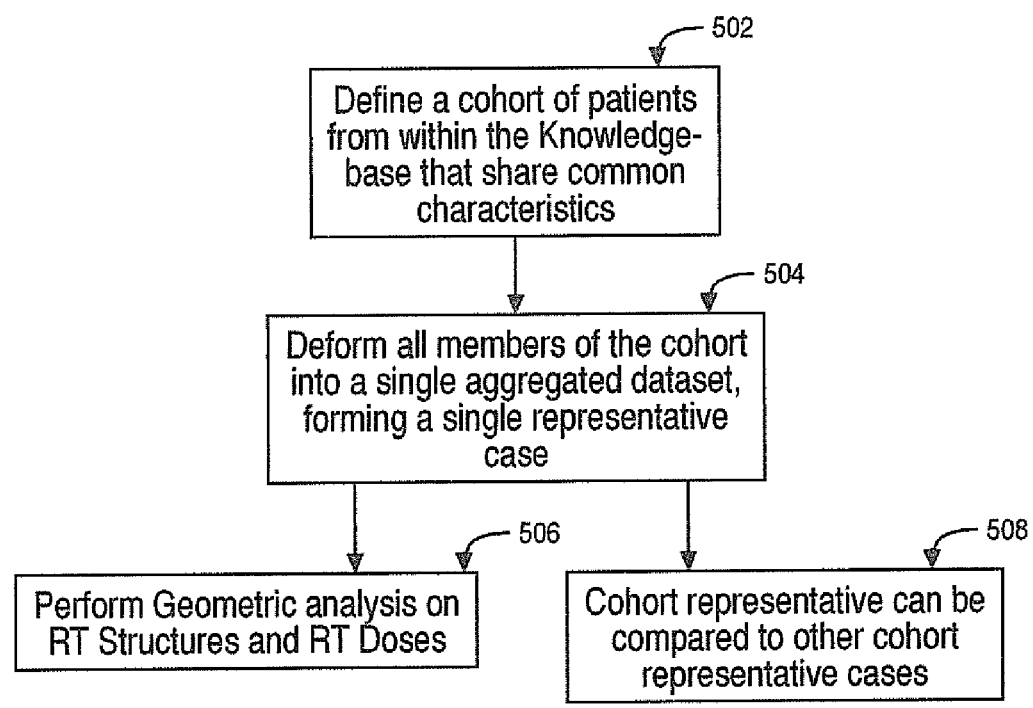
FIG. 5 illustrates the step of a process for selecting, deforming, and comparing cohorts in accordance with an embodiment of the present invention.

FIG. 5 illustrates the steps of a process in accordance with an embodiment of the present invention. In step 502, a cohort of patients or reference image sets 102a-102n within the knowledge-base are selected that share common characteristics. These common characteristics can include diagnosis, sex, age, race, treatment site, etc. In step 504, all members of the cohort are deformed into a single aggregated dataset, forming a single representative case. In step 506, geometric analysis is performed on the radiation therapy for structures of interest and the associated radiation therapy doses. In step 508, cohort representatives are compared to other cohort representative cases.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for segmenting image data sets, comprising:
   accessing a medical image set, wherein the medical image set comprises at least one image containing at least one structure;
   computing a landmark signature based on the medical image set, wherein the landmark signature comprises a number of points;
   identifying a structure of interest in the medical image set based on the number of points in the landmark signature;
   searching a knowledge-base, the knowledge-base comprising reference image sets, wherein each of the reference image sets comprises at least one image containing at least one structure;
   selecting a plurality of the reference image sets containing the structure of interest from the knowledge-base to form a base set,
   deforming at least a portion of the plurality of the reference image sets in the base set by registering the portion of the selected reference image sets to the medical image set; and
   determining a weighted-average of the plurality of the selected reference image sets that were deformed, to provide a weighted-average segmentation for the structure of interest.

2. The method of claim 1, further comprising:
   using the weighted-average segmentation for the structure of interest as a seed for at least one structure-specific segmentation algorithm.

3. The method of claim 1, wherein the base set for the structure of interest is formed from a cohort of reference image sets within the knowledge-base that share common characteristics, wherein the common characteristics are selected from the group consisting of: sex, diagnosis, stage, responder versus non-responders, age, treatment site, and size.

4. The method of claim 1, wherein said searching comprises:
   narrowing a search of the knowledge-base to the reference image sets in the knowledge-base that correspond to the structure of interest identified by the number of points in the landmark signature.

5. The method of claim 4, wherein said deforming comprises:
   for each structure of interest of the plurality of different structures of interest, deforming points of a plurality of landmark signatures of the portion of the plurality of the selected reference image sets of the base set to the points of the landmark signature of the medical image set.

6. The method of claim 4, wherein said searching further comprises:
   comparing meta-data from the medical image set to meta-data of the reference image sets in the knowledge-base, and
   comparing landmark signatures of the medical image set to landmark signatures of the reference image sets in the knowledge-base.

7. The method of claim 1, further comprising:
   updating a plurality of statistical analysis tools that determine the weighted-average segmentation for the structure of interest.

8. The method of claim 1, wherein said deforming comprises:
   for the structure of interest, deforming the portion of the plurality of the selected reference image sets of the base set with a deformable image registration algorithm.

9. The method of claim 1, wherein said deforming comprises:
   for the structure of interest, deforming segmented structures of interest from the portion of the plurality of the selected reference image sets of the base set to create a map to the medical image set.

10. The method of claim 1, further comprising:
    reviewing and correcting contours; and
    adding an approved medical image set and corresponding structures of interest to the knowledge-base as a new reference image set.

11. A method for segmenting image data sets, comprising:
    accessing a medical image set, wherein the medical image set comprises at least one image containing a plurality of different structures of interest;
    searching a knowledge-base, the knowledge-base comprising reference image sets and also comprising reference image set sub-volumes, each of the sub-volumes containing a structure of interest;
    selecting a plurality of the reference image sets from the knowledge-base to form a base set;
    deforming at least a portion of the plurality of the selected reference image sets of the base set to generate mappings from the base set to the medical image set, wherein each of the selected reference image sets is individually deformed;
    after said deforming of the portion of the plurality of the selected reference image sets, determining a first weighted-average of the portion of the plurality of the selected reference image sets to provide a first weighted-average segmentation for the plurality of different structures of interest in the medical image set;
    computing a landmark signature for each structure of interest of the plurality of different structures of interest of the medical image set, wherein each landmark signature comprises a number of points;
    based on the number of points in the respective landmark signature, identifying a respective structure of interest corresponding to the number of points and selecting a plurality of the reference image set sub-volumes from the knowledge-base to form a sub-volume base set for each respective structure of interest, wherein said selecting comprises selecting different reference image set sub-volumes for each respective structure of interest;

for each respective structure of interest of the plurality of different structures of interest, deforming at least a portion of the plurality of the selected reference image set sub-volumes of the sub-volume base set to generate mappings from the sub-volume base set to the corresponding respective structure of interest of the medical image set, wherein each of the selected reference image set sub-volumes is individually deformed; and after said deforming of the portion of the plurality of the selected reference image set sub-volumes, for each respective structure of interest, determining a second weighted-average of the plurality of the selected reference image set sub-volumes that were deformed to provide a second weighted-average segmentation.

12. The method of claim 11, further comprising:
using the second weighted-average segmentation for a structure of interest as a seed for at least one structure-specific segmentation algorithm.

13. The method of claim 11, wherein the base set for a structure of interest is formed from a cohort of reference image sets within the knowledge-base that share common characteristics, wherein the common characteristics are selected from the group consisting of: sex, diagnosis, stage, responder versus non-responders, age, treatment site, and size.

14. The method of claim 11, further comprising:
updating a plurality of statistical analysis tools that determine the first and second weighted-average segmentations.

15. The method of claim 11, wherein said deforming at least a portion of the plurality of the selected reference image sets of the base set and said deforming at least a portion of the plurality of the selected reference image set sub-volumes of the sub-volume base set, comprises:
deforming the portion of the plurality of the selected reference image sets of the base image with a deformable image registration algorithm; and
deforming the portion of the plurality of the selected reference image set sub-volumes of the sub-volume base set with the deformable image registration algorithm.

16. The method of claim 11, wherein said deforming at least a portion of the plurality of the selected reference image sets of the base set and said deforming at least a portion of the plurality of the selected reference image set sub-volumes of the sub-volume base set, comprises:
deforming segmented structures of interest from the portion of the plurality of the selected reference image sets of the base set to create a map to the medical image set; and
for each structure of interest of the plurality of different structures of interest, deforming segmented structures of interest from the portion of the plurality of the selected reference image set sub-volumes of the sub-volume base set to create a map to the corresponding structure of interest of the medical image set.

17. The method of claim 11, wherein said deforming at least a portion of the plurality of the selected reference image sets of the base set and said deforming at least a portion of the plurality of the selected reference image set sub-volumes of the plurality of sub-volume base sets, comprises:
deforming points of a plurality of landmark signatures of the portion of the plurality of the selected reference image sets of the base set to points in a landmark signature of the medical image set; and for each structure of interest of the plurality of different structures of interest, deforming points of a plurality of landmark signatures of the portion of the plurality of the selected reference image set sub-volumes of the sub-volume base set to the points in the respective landmark signature for the corresponding structure of interest in the medical image set.

18. The method of claim 11, further comprising:
comparing meta-data from the medical image set to meta-data of the reference image sets in the knowledge-base, and
comparing landmark signatures of the medical image set to landmark signatures of the reference image sets in the knowledge-base.

19. The method of claim 11, further comprising:
comparing meta-data from the medical image set to meta-data of the reference image sets in the knowledge-base, and
comparing landmark signatures of each structure of interest of the medical image set to landmark signatures of corresponding structures of interest of the reference image sets in the knowledge-base.

20. The method of claim 11, further comprising:
reviewing and correcting contours; and
adding an approved medical image set and corresponding structures of interest to the knowledge-base as a new reference image set.

21. A non-transitory computer readable media comprising computer-executable instructions stored therein, the computer-executable instructions comprising:
instructions to compute a landmark signature based on a medical image set, wherein the landmark signature comprises a number of points;
instructions to identify a structure of interest in the medical image set based on the number of points in the landmark signature;
instructions to access a knowledge-base, the knowledge-base comprising reference image sets, wherein each of the reference image sets contains at least one image containing at least one structure;
instructions to search the knowledge-base and select reference image sets from the knowledge-base containing the structure of interest to form a base set;
instructions to deform, for the structure of interest, at least a portion of the plurality of the selected reference image sets of the base set by registering the portion of the selected reference image sets of the base set to the medical image set;
instructions to determine, for the structure of interest, a weighted-average of the plurality of the selected reference image sets that were deformed to provide a weighted-average segmentation for the structure of interest; and
instructions to update a statistical model using the weighted-average segmentation for the structure of interest, the statistical model useful as a seed for automatic segmentation of the structures of interest.

22. The computer readable media of claim 21, wherein the instructions to update the statistical model further comprise:
instructions to use the weighted-average segmentation as a seed for at least one structure-specific segmentation tool; and
instructions to determine a weighted-average segmentation result for the structure of interest using results from the structure-specific segmentation tool, the updated statistical model comprising the weighted-average segmentation result for the structure of interest.

23. The computer readable media of claim 21, wherein the instructions to select reference image sets to form the base set comprise instructions to form the base set from a cohort of reference image sets within the knowledge-base that share common characteristics, wherein the common characteristics are selected from the group consisting of: sex, diagnosis, stage, responder versus non-responders, age, treatment site, and size.

24. The computer readable media of claim 21, wherein the instructions to select reference image sets to form the base set comprise:
    instructions to search only the reference image sets in the knowledge-base that correspond to the structure of interest identified by the number of points in the landmark signature.

25. The computer readable media of claim 24, wherein the instructions to deform at least a portion of the plurality of the selected reference image sets of the respective base set, comprise:
    instructions to deform, for the structure of interest, points of a plurality of landmark signatures of the portion of the plurality of the selected reference image sets of the base set to the points of the landmark signature of the medical image set.

26. The computer readable media of claim 24, wherein the instructions to search the knowledge-base, comprise:
    instructions to compare meta-data from the medical image set to meta-data of the reference image sets in the knowledge-base, and
    instructions to compare landmark signatures of the medical image set to landmark signatures of the reference image sets in the knowledge-base.

27. The computer readable media of claim 21, wherein the computer-executable instructions further comprise:
    instructions to update, for the structure of interest, a plurality of statistical analysis tools that determine the weighted-average segmentation.

28. The computer readable media of claim 21, wherein the instructions to deform at least a portion of the plurality of the selected reference image sets of the base set, comprise:
    instructions to deform the portion of the plurality of the selected reference image sets of the base set with a deformable image registration algorithm.

29. The computer readable media of claim 21, wherein the instructions to deform at least a portion of the plurality of selected reference image sets of the base set, comprise:
    instructions to deform, for the structure of interest, segmented structures of interest from the portion of the plurality of the selected reference image sets of the base set to create a map to the medical image set.

30. The computer readable media of claim 21, wherein the computer-executable instructions further comprise:
    instructions to review and correct contours; and
    instructions to add an approved medical image set and corresponding structures of interest to the knowledge-base as a new reference image set.

* * * * *